GEORGE RUSTON.

Improvement in Butter-Workers.

No. 127,520.

Patented June 4, 1872.

Witnesses:
John Becker.
W. A. Graham.

Inventor:
George Ruston.
per
Attorneys.

UNITED STATES PATENT OFFICE.

GEORGE RUSTON, OF FREEPORT, ILLINOIS.

IMPROVEMENT IN BUTTER-WORKERS.

Specification forming part of Letters Patent No. 127,520, dated June 4, 1872.

Specification describing a new and useful Improvement in Butter-Worker, invented by GEORGE RUSTON, of Freeport, county of Stephenson, and State of Illinois.

Figure 1:
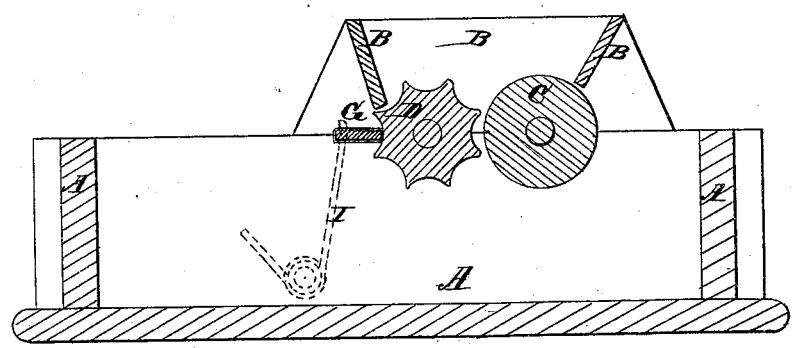
Figure 2:
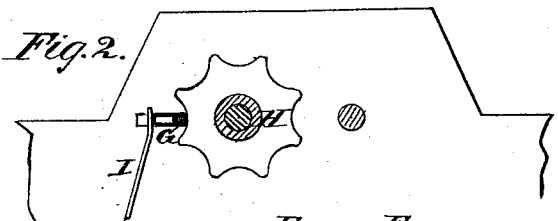
Figure 3:
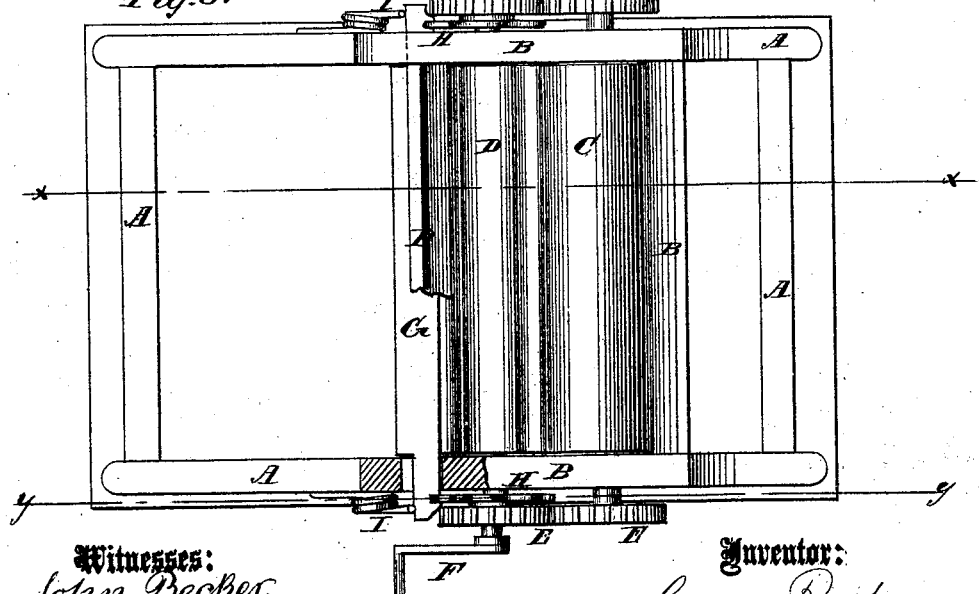

In the accompanying drawing, Fig. 1 is a detail vertical longitudinal section of my improved machine taken through the line $x\ x$ Fig. 3. Fig. 2 is a side view of a part of the same, partly in section, through the line $y\ y$ Fig. 3. Fig. 3 is a top view of the same, part being broken away to show the construction.

Similar letters of reference indicate corresponding parts.

My invention has for its object to furnish an improved machine for working butter, which shall be simple in construction, convenient in use, and effective in operation, working the butter in about the same manner as when worked by hand, and which will work it evenly and will not injure it; and it consists in the construction and combination of the various parts of the machine, as hereinafter more fully described.

A represents a box or receptacle to receive the butter from the worker. B is a hopper, the end boards of which rest upon and are secured to the top edges of the side boards of the box A. C D are two rollers, the journals of which revolve in bearings in the end boards of the hopper B. The ends of the rollers C D project, and to them are attached, at each end of the hopper B, gear-wheels E, which mesh into each other, as shown in Fig. 3. To one of the journals of the rollers C D is attached the crank F, by which the machine is operated. One of the rollers, C, is nearly round, and the other is fluted or corrugated longitudinally, as shown in Figs. 1 and 3, said flutes or corrugations being only sufficient to draw in the butter, so that the tendency may be to squeeze the butter, which does not crush or harm it. The butter is kept from sticking to the fluted roller D by the scraper G, which extends along the outer side of the roller D, and the ends of which enter horizontal slats in the end boards of the hopper B. The inner edges of the ends of the scraper G rest against the faces of two wheels, H, attached to the journals of the roller D, and which are toothed or notched to correspond with the corrugations of the said roller D, so that the inner edge of the scraper may be always close to the face of the corrugated roller D without rubbing against it. The ends of the scraper G should have small friction-rollers pivoted to them to roll along the faces of the wheels H to prevent wear. The scraper G is held up to its place by the springs I, which are attached to the box A, and which press against the said ends, as shown in Fig. 3, and in dotted lines in Fig. 1.

Having thus described my invention, I claim as new and desire to secure by Letters Patent—

The combination of the round roller C, fluted roller D, gear-wheels E, scraper G, notched wheels H, and springs I with each other and with the hopper B, substantially as herein shown, and for the purpose set forth.

GEORGE RUSTON.

Witnesses:
JAS. H. PRESCOTT,
E. W. TAYLOR, M. D.